Jan. 2, 1968  R. P. BROWN  3,361,903
LIGHT SOURCE FOR A FILM PROJECTOR
Filed Dec. 3, 1965
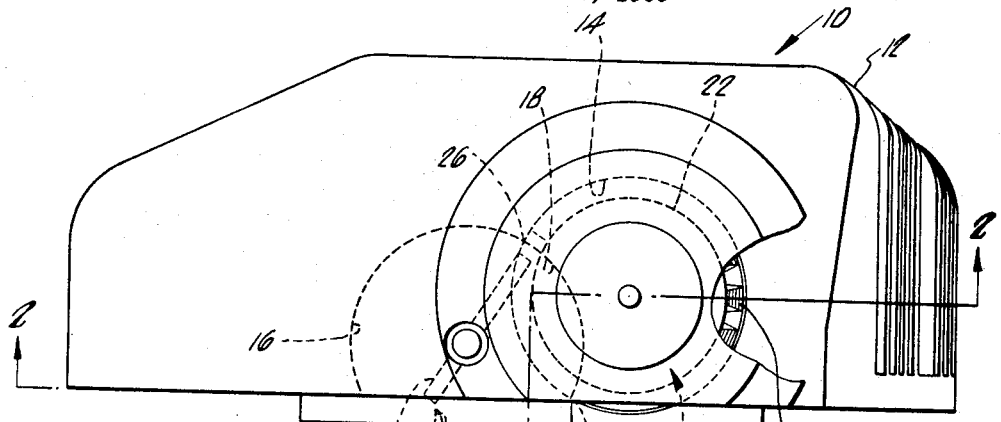
FIG. 1.
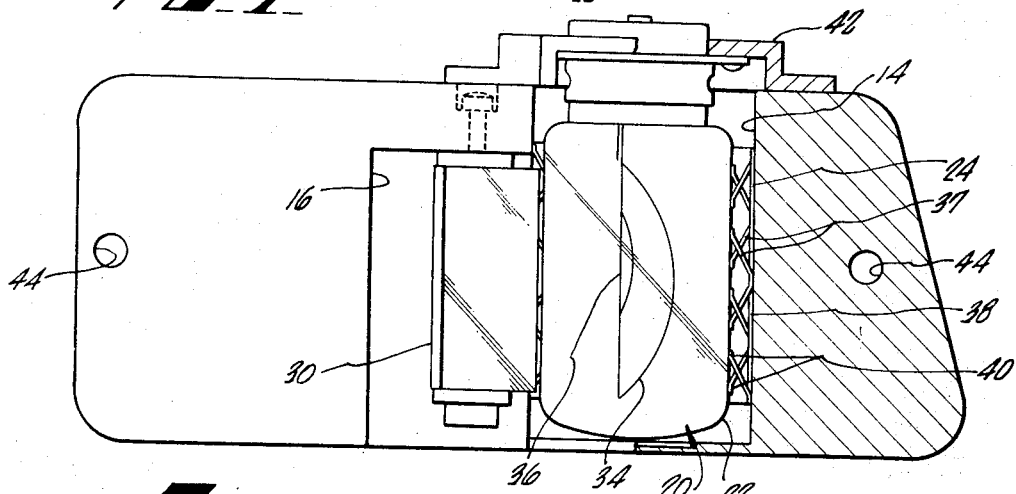
FIG. 2.  FIG. 3.
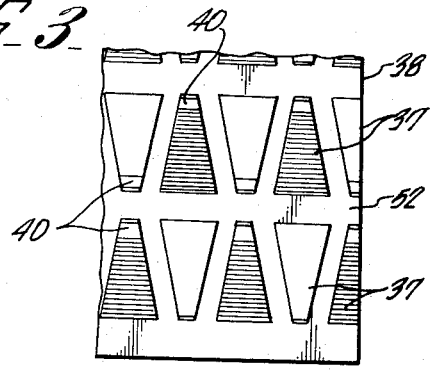
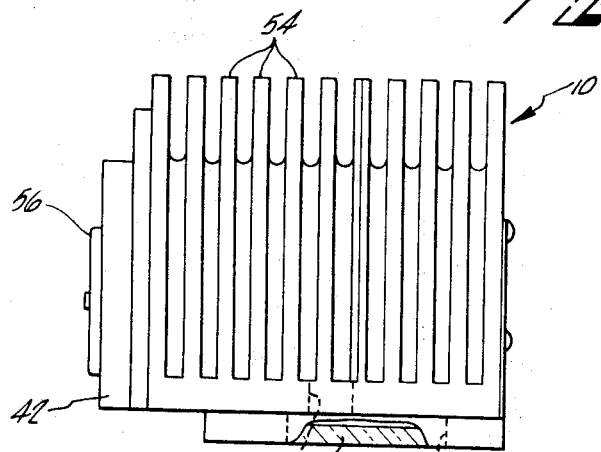
FIG. 4.
INVENTOR.
RICHARD P. BROWN
BY
Christie, Parker & Hale
ATTORNEYS.

United States Patent Office 3,361,903
Patented Jan. 2, 1968

3,361,903
LIGHT SOURCE FOR A FILM PROJECTOR
Richard P. Brown, Monrovia, Calif., assignor to Consolidated Electrodynamics Corporation, Pasadena, Calif., a corporation of California
Filed Dec. 3, 1965, Ser. No. 511,502
4 Claims. (Cl. 240—47)

ABSTRACT OF THE DISCLOSURE

A light source especially adapted for use in motion picture projectors utilizing a heat sink in place of air cooling. An aperture is provided in one wall of the heat sink for permitting visible radiations from the source to be directed out of the housing toward film to be illuminated. A compressible material of high heat conductivity is disposed against the surface of the light source envelope in heat conductive relationship with the glass of the envelope and the heat conductive material of the heat sink. A mirror with a dichroic coating is interposed in the optical path between the source and the aperture in the heat sink.

---

This invention relates to high intensity light sources such as projection lamps and, in particular, to housings for such lamps.

In conventional slide and motion picture projectors, it is typical for the projector to employ a high-intensity light source for directing illumination through film. Such a source is necessary in order to provide sufficient brightness to project the image recorded on the film onto a screen located at some distance from the projector. It is typical of sources used in such applications that their high-intensity radiation means a corresponding high-operating temperature.

The high temperatures associated with such a source impose a requirement that steps be taken to prevent a heat build-up in the area of the source in order to prevent possible damage to the lamp and to the film which is normally located between the source and a projection lens. In the most common approach to the problem, the projector is provided with forced air cooling. This forced air cooling is typically provided by means of a fan and drive motor for directing a flow of air over the light source envelope to carry heat away from it and set up a circulation of air through intake and outlet vents provided in the projector housing.

The use of a fan and motor in a projector means that a certain ambient noise level is associated with the projector. This can be an annoying distraction in certain situations, for example, in using home slide and motion picture projectors. Furthermore, it makes any narration accompanying the projected subject matter difficult because the narrator is forced to speak over the noise level in the projection room and the listeners frequently have to strain to catch the narration. As the size of the film to be projected increases as, for example, from 8 mm. to 35 mm., so also does the size of the cooling apparatus causing accentuation of the problems just indicated.

The use of a forced air cooling system can be undesirable for other reasons. A number of pieces of apparatus must be provided in the projector housing in order to provide the cooling function. The additional parts and assembly time mean an increased cost of manufacture of the projector. In addition, there is the problem of additional weight of the fan, etc. and the need for space within the projector to house them.

The present invention provides a space and weight-saving alternative to the forced air cooling method and apparatus just described. The invention provides a light source which comprises a housing of a heat conductive material having an aperture therein. The housing has a source of illumination having a transparent envelope located within it in a heat transfer relationship therewith. Means are located within the housing for establishing a heat transfer between the envelope and the housing and for compensating for the difference in the coefficients of heat expansion of the envelope and housing materials means are also provided for retarding the passage of heat from the source through the aperture. In a preferred embodiment of the housing of this invention, the available radiating surface area is increased by providing fins and the like on one or more exterior surfaces of the housing.

In one embodiment, the invention provides a housing for a high-intensity light source in which the heat-retarding means is a mirror adapted to reflect visible radiations from the light source to the aperture while transmitting infrared radiations to the housing interior. Means are also provided for securing the light source in position relative to the housing and for securing the housing in position relative to the object to be illuminated by the source.

In another embodiment, the invention provides a housing for a light source in which the retarding means is a transparent plate located between the source and aperture, the plate being adapted to transmit visible radiations through the aperture while reflecting infrared radiations away from the aperture. In a third embodiment the transparent plate located within the aperture is adapted to absorb heat while transmitting radiations in the visible portion of the spectrum.

In still another embodiment a heat absorbing or heat reflecting glass is located in the aperture and a conventional mirror is interposed in the optical path from the source to the aperture for reflecting radiations from the source to the aperture.

The primary utility of the housing of this invention is in projectors, particularly motion picture projectors. By providing a heat sink of sufficient size, the housing of this invention can be used to replace the forced air-cooling means currently in use in 8, 16 and 35 mm. motion picture projectors. The housing is also useful in slide projectors. In addition, such a lamp housing is utilizable in other apparatus which require high-intensity light sources for their operation and which are currently provided with forced air cooling to prevent undesirable heat buildup adjacent the source envelope.

The features and other applications of the invention will be more apparent after reference is had to the following figures in which:

FIG. 1 is a front elevational view of the housing of this invention showing the relative orientation of the light source and heat retarding means;

FIG. 2 is a section view along lines 2—2 of FIG. 1;

FIG. 3 is a detail view of an insert liner of a spring finger material interposed between the source envelope and interior wall of the housing, and FIG. 4 is an end view of the housing.

An embodiment of a light source 10 of this invention is shown in FIGS. 1 and 2. The light source comprises a structure 12 in the form of a source housing which is fabricated from a block material such as aluminum, copper or other heat-conductive material. The structure is suited for fabrication by machining or casting and is provided with two chambers, a first chamber 14 and a second chamber 16, located approximately in the center of the housing. In the embodiment of FIG. 1 the two chambers are cylindrical passages through the structure which intersect each other and define an aperture 18.

The first chamber 14 is adapted to receive a light source 20 comprising a filament 36 located within a transparent envelope 22. An example of such a light source is a projection lamp (mold) manufactured by Sylvania Electric Co. under designation DN117. An insert liner 24 of a compressible, heat-conductive material is located circumjacent envelope 22 spacing the envelope a short distance from the interior wall of chamber 14. In the preferred embodiment, liner 24 extends around the light source envelope 22 over approximately 75% of the surface thereof beginning at a point approximately adjacent side 26 of aperture 18 and circumscribing the envelope to side 28 of aperture 18. In this way an unobstructed optical path from the filament 36 through aperture 18 is established.

A plate 30 for reflecting visible radiations from the source 20 is located in chamber 16. The plate 30 is oriented relative to aperture 18 and source 20 such that such radiations are directed through an aperture 32 in the base of structure 12. In the embodiment shown, plate 30 is a mirror having what is commonly referred to as a cold mirror coating disposed over the surface thereof. A coating such as that manufactured by the Liberty Mirror Div. of Libbey-Owens-Ford Glass Company under the designation No. 956, is an example of such a coating. This coating is characterized by a reflectivity for radiations in the visible portion of the spectrum of approximately 90% of the total radiations in that portion of the spectrum which are incident upon the surface upon which the coating is disposed. At the same time such a coating is further characterized by a transmissivity to radiations in the infrared portion of the spectrum (heat) which is not less than 80% of the total infrared radiation incident thereupon. The purpose of such a mirror is to permit visible radiations to be passed through aperture 32 while preventing the passage of infrared radiations.

In a preferred embodiment a transparent plate or shield 31 (see FIG. 4) is located in aperture 32 to prevent flying glass from passing therethrough to the exterior of the housing in the event the envelope 22 of the light source 20 should explode.

The embodiment shown in FIG. 1 is one example of the way in which visible radiations from a light source may be transmitted to the exterior of the housing 12 while preventing the passage therefrom of heat radiations, i.e., radiations in the infrared portion of the spectrum. An alternate embodiment is to locate aperture 32 in a direct optical path from envelope 22 and provide a specially prepared transparent plate in the aperture. In this case the specially prepared plate has characteristics opposite that of the cold mirror coating, viz., a high degree of transmissivity for radiations in the visible portion of the spectrum and a corresponding high degree of reflectivity for radiations in the infrared portion of the electromagnetic spectrum. An example of such a glass is glass manufactured by Kaufman Glass Co. of Wilmington, Del. under the designation Infra-Red Reflecting Glass. A third possibility is to insert a plate of what is described as heat glass or heat resistant glass, a glass having a characteristic analogous to a high-pass electrical filter. This type of glass absorbs a substantial portion of the radiations from the light source which fall within the infrared portions of the spectrum preventing transmission of such radiations to the exterior of the housing while passing radiations of a shorter wavelength. An example of such a glass is that distributed by Chance Bros., Ltd. of Great Britain under the designation ON20 glass.

Still another embodiment for preventing or retarding the passage of heat from the source through the aperture to the film is to use a conventional mirror in an arrangement such as shown in FIG. 1 and locate a heat-reflecting or heat-absorbing glass in or between the mirror and aperture 32.

By retarding the passage of heat generated by the light source through the housing aperture 32 by whichever means used, the housing 12 can be located relatively close to the film frame or strip to be illuminated to provide maximum brightness for a source of given power without damaging the film due to excessive heat.

Certain aspects of the source of this invention are more fully illustrated in FIG. 2, a section view taken along lines 2—2 of FIG. 1. As shown therein, the light source 20 is disposed in chamber 14 adjacent chamber 16 wherein is disposed the cold mirror 30. The envelope 22 of source 20 has located therewithin an elliptical mirror 34 oriented such that radiations from the filament 36 are reflected toward cold mirror 30 and subsequently focussed in the plane of the projection lens with which this housing is associated.

The insert liner 24 of compressible material disposed over a portion of the surface of envelope 22 is also more clearly illustrated in FIG. 2. As shown therein, the material comprises a plurality of criss-crossed fingers 37 rising from a base 38 and contacting the envelope along portions 40 of fingers 37 which are parallel to base 38. A compressible material such as the multi-fingered insert liner is necessary for establishing a heat transfer relationship between the envelope and the housing and for compensating the difference in the coefficient of expansion of the glass envelope 22 and the aluminum, copper, etc. of the housing 12. Since glass expands at a rate that is different than the materials normally used in the housing, the compressible liner 24 provides a means for the efficient conduction of heat away from the envelope while at the same time preventing a rupture of the envelope due to unequal amounts of expansion and contraction by the envelope and housing. The liner 24 is illustrative of the need for providing means for compensating for the normally different coefficients of heat expansion of the materials from which the housing and envelope are frabricated. Possible substitutes for the spring finger insert liner include a compressible, heat-conductive vacuum tube sheathing material such as that manufactured by the International Electronic Research Corporation under the designation Therma-flex liner.

A plate 42 secured to one side of the housing 12 is adapted to secure the light source 20 to the housing 12. A pair of apertures 44 passing through the base 39 of the housing 12 are provided for securing the light source in position as, for example, in a projector.

An exploded view of the insert liner 24 is shown in plan view in FIG. 3. As shown therein, the liner has a plurality of approximately triangular cutouts or fingers 37 disposed in line at regular intervals along one dimension of the liner. Half of the cutouts 37 point in one direction and half in the opposite direction. Located approximately at the apex of the triangular cutouts 37 is a surface 40 which is parallel to the base 38 of the liner. Surfaces 40 are the points of contact between the light source envelope 22 and insert liner 24 shown in FIGS. 1 and 2. A material such as Phosphor bronze or beryllium-copper has been found to be satisfactory as the insert liner material. Such an alloy has the desired tensile strength and heat conductivity for providing a satisfactory liner between the envelope of a high intensity source and an interior wall of a housing such as the structure 12.

To increase the radiation efficiency of the housing 12 at least one surface may be provided with a plurality of fins 54 as shown in FIGS. 1 and 4 to present the maximum amount of surface area to the atmosphere surrounding the housing. Also shown in FIG. 4 is the base 56 of the light source 20 which is located in chamber 14 within the housing and secured to the housing by mounting plate 42. The location and length dimension of aperture 32 is also illustrated in FIG. 4.

The housing is particularly adapted for use in motion picture projectors such as the projectors to be used in the system described in copending application Ser. No. 485,768 filed Sept. 8, 1965. Since one of the preferred embodiments of this entertainment system disclosed in that application is for use in aircraft, the light source and housing of this invention has an advantage over other means of cooling a projection lamp in that it is of lighter weight, an important consideration in airborne equipment. In addition to the weight-saving advantage, the source of this invention has advantages which also make it useful in

What is claimed is:
1. A housing for a high intensity light source comprising:
   a structure of a heat conductive material, said structure having means provided on the exterior of the structure for increasing the effective heat radiation therefrom;
   a passage in the structure for receiving the light source envelope;
   a heat conductive lining of a compressible material located within the passage, the lining being disposed about and in contact with a major portion of the exterior surface of the light source envelope and the interior surface of the passage;
   a light focussing mirror located within the passage between the heat conductive lining and the light source;
   an aperture in the structure; and
   mirror means located within the structure along an optical path from the passage to the aperture, the mirror means being adapted to reflect radiations in the visible portion of the spectrum and transmit radiations in the infrared portions of the spectrum.
2. A housing according to claim 1 wherein a transparent window is located in the aperture.
3. A housing according to claim 2 wherein means are provided for securing the light source envelope within the passage and for securing the housing in position relative to the object to be illuminated.
4. A light source for a film projector comprising:
   a housing having a first and second chamber, a first aperture between the two chambers and a second aperture between the second chamber and the housing exterior,
   a light source having a transparent envelope located within the first chamber, the source having an elliptical mirror located within the envelope,
   an insert liner located in contact with the interior of the first chamber having a plurality of flexible fingers in heat conductive contact with the envelope, the liner extending around the envelope except adjacent the first aperture,
   reflective means having a cold mirror coating disposed on the surface thereof located in the second chamber and oriented so as to reflect visible radiations from the source to the second aperture while retarding the passage of heat from the source to the second aperture,
   a transparent shield located in the second aperture, and
   a plurality of fins located on at least one surface of the exterior of the housing for increasing the heat radiating surface thereof.

References Cited
UNITED STATES PATENTS

| | | | |
|---|---|---|---|
| 1,642,646 | 9/1927 | Chase | 240—102.1 X |
| 2,007,489 | 7/1935 | Westberg | 240—47 |
| 2,385,526 | 9/1945 | McNabb | 240—47 |
| 2,395,561 | 2/1946 | Osterberg et al. | 240—47 X |
| 2,552,184 | 5/1951 | Koch | 88—24 |
| 2,798,943 | 7/1957 | Prideaux | 240—47 |
| 2,852,980 | 9/1958 | Schroder | 88—24 X |

NORTON ANSHER, *Primary Examiner.*

DAVID L. JACOBSON, *Assistant Examiner.*